(12) United States Patent
Sun et al.

(10) Patent No.: US 10,699,751 B1
(45) Date of Patent: Jun. 30, 2020

(54) METHOD, SYSTEM AND DEVICE FOR FITTING TARGET OBJECT IN VIDEO FRAME

(71) Applicant: Wangsu Science & Technology Co., Ltd., Shanghai (CN)

(72) Inventors: Lei Sun, Shanghai (CN); Fenglei Wang, Shanghai (CN)

(73) Assignee: Wangsu Science & Technology Co., LTD., Shanghai (CN)

( * ) Notice: Subject to any disclaimer, the term of this patent is extended or adjusted under 35 U.S.C. 154(b) by 0 days.

(21) Appl. No.: 16/442,081

(22) Filed: Jun. 14, 2019

Related U.S. Application Data (63) Continuation of application No. PCT/CN2019/077236, filed on Mar. 6, 2019.

(51) Int. Cl.
| | |
|---|---|
| *G11B 27/34* | (2006.01) |
| *G11B 27/036* | (2006.01) |
| *G06K 9/00* | (2006.01) |
| *G06K 9/62* | (2006.01) |

(52) U.S. Cl.
CPC ........ *G11B 27/036* (2013.01); *G06K 9/00718* (2013.01); *G06K 9/6256* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 2006/0034527 A1* | 2/2006 | Gnitsevich | G06T 9/004 |
| | | | 382/232 |
| 2017/0109871 A1* | 4/2017 | Nakano | G06T 5/008 |
| 2017/0205228 A1* | 7/2017 | Li | G01B 11/28 |

* cited by examiner

*Primary Examiner* — Eileen M Adams
(74) *Attorney, Agent, or Firm* — Davis Wright Tremaine LLP

(57) ABSTRACT

Part of the present application provides a method, system and device for fitting a target object in a video frame. The method comprises: identifying a region where the target object is located in the video frame; selecting one or more geometric figures to fit the region where the target object is located, such that a combination of the one or more geometric figures covers the region where the target object is located; and generating a fitting parameter for each of the geometric figures according to a type of the geometric figure and a layout parameter of the geometric figure in the video frame, and taking a combination of the fitting parameters of respective geometric figures as a fitting parameter of the video frame. With the embodiments of the present application, the data amount after fitting is reduced, thereby improving efficiency of subsequent processes.

20 Claims, 3 Drawing Sheets

S1: Identifying a region where the target object is located in the video frame

S3: Selecting one or more geometric figures to fit the region where the target object is located, such that a combination of the one or more geometric figures covers the region where the target object is located S5: Generating a fitting parameter for each of the geometries according to a type of each of the geometric figures and a layout parameter of each of the geometric figures in the video frame, and taking a combination of the fitting parameters of respective geometric figures as a fitting parameter of the video frame

METHOD, SYSTEM AND DEVICE FOR FITTING TARGET OBJECT IN VIDEO FRAME

CROSS-REFERENCE TO RELATED APPLICATIONS

The present application is a continuation of International Application No. PCT/CN2019/077236, filed on Mar. 6, 2019, which claims benefit of Chinese Application No. 201910105682.5 filed Feb. 1, 2019, the contents of which are incorporated herein by reference in their entirety.

TECHNICAL FIELD

The present application relates to the technical field of Internet technologies, and in particular, to a method, system and device for fitting a target object in a video frame.

BACKGROUND

With continuous development of video playing technology, the demand for performing image process on video screens is also increasing. Currently, in many application scenarios, it is necessary to fit a main target object from the video screen, and then perform processes subsequently according to the fitted target object. For example, some self-media needs to produce a synopsis with pictures based on contents of the videos. Under such circumstance, it is necessary to fit main characters from the video screen, and then produce a synopsis of the video according to the fitted main characters and words to be added later. For example, when barrage information is displayed on a video playing screen, in order to prevent occlusion of barrage information on main objects in the video screen sometimes, the main objects have to be fitted from the video screen first, and then blocking of the fitted main objects may be avoid by processing the barrage.

The inventor notice that there are at least the following problems in the existing technology: at present, a target object in a video frame is usually fitted by means of a binary mask image. Specifically, a binary mask image in consistent with the video frame may be generated in which a region where the target object is located may have different pixel value from that of other regions. Then, processes may be performed on the binary mask image subsequently. However, the data amount of the binary mask image is generally large, thus the amount of data to be processed subsequently would be increased if the target object is fitted according to the binary mask image, resulting in a lower processing efficiency.

SUMMARY

In order to solve the problem in the existing technology, embodiments of the present application provide a method and terminal for playing a video file as follows:

The embodiments of the present application provides a method for fitting a target object in a video frame, comprising: identifying a region where the target object is located in the video frame; selecting one or more geometric figures to fit the region where the target object is located, such that a combination of the one or more geometric figures covers the region where the target object is located; and generating a fitting parameter for each of the geometric figures according to a type of the geometric figure and a layout parameter of the geometric figure in the video frame, and taking a combination of the fitting parameters of each of the geometric figures as a fitting parameter of the video frame.

The embodiments of the present application further provides a system for fitting a target object in a video frame, comprising: a region identifying unit configured for identifying a region where the target object is located in the video frame; a geometric figure selecting unit configured for selecting one or more geometric figures to fit the region where the target object is located, such that a combination of the one or more geometric figures covers the region where the target object is located; and a fitting parameter generating unit configured for generating a fitting parameter for each of the geometric figures according to a type of the geometric figure and a layout parameter of the geometric figure in the video frame, and taking a combination of the fitting parameters of each of the geometric figures as a fitting parameter of the video frame.

The embodiments of the present application further provides a device for fitting a target object in a video frame, wherein, the device comprises a processor and a memory configured for storing a computer program, which when being processed by the processor, implements the method as described above.

As compared with the existing technology, the embodiments of the present application may identify, with respect to the target object in the video frame, the region where the target object is located. The target object in the video frame may then be covered with a combination of one or more geometric figures by a geometric fitting. After determining the one or more geometric figures cover the target object, the fitting parameters of the geometric figures may be generated, the fitting parameters may indicate the type of each of the geometric figures and the layout of each of the geometric figures in the video frame. The fitting parameters of the geometric figures are not image data, thus, the data amount after fitting is reduced, thereby improving efficiency of subsequent processes.

BRIEF DESCRIPTION OF THE DRAWINGS

One or more embodiments are illustrated with the drawings corresponding thereto, and the illustration set forth herewith are not intended to limit the embodiments.

DETAILED DESCRIPTION

In order to make the object, technical solutions and advantages of the present application clearer, some of embodiments of the present application will be further described in details below with reference to the accompanying drawings. It is appreciated that the specific embodiments described herein are merely for illustrating instead of limiting the application.

Figure 1:
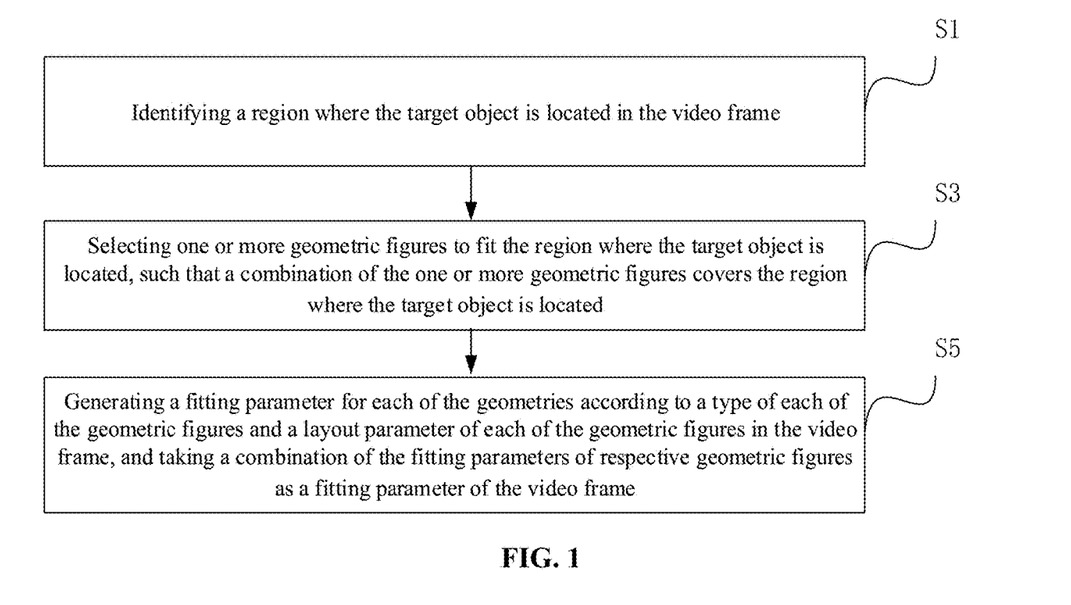
FIG. 1 is a schematic diagram illustrating a method for fitting a target object according to an embodiment of the present application.

The present application provides a method for fitting a target object in a video frame, and the method may be applied to a device having an image processing function. Referring to FIG. 1, the method comprises the following steps.

At S1, identifying a region where the target object is located in a video frame.

In this embodiment, the video frame may be any of video frames in video data to be parsed. The video data to be parsed may be video data of an on-demand video that has been uploaded in the device, or may be video data of a live video stream received by the device, and the video data may include data of each of the video frames. The device may read the video data to be parsed and process each of the video frames in the video data. Specifically, the device may predetermine in the video data a target object that needs to be identified, and the target object may be, for example, a character presenting in a video screen. Of course, the target object may also be changed flexibly according to different video contents. For example, in a live video showing daily life of a cat, the target object may be a cat.

In this embodiment, with respect to any one of the video frames in the video data, a region where the target object is located may be identified from the video frame. In particular, identification of the target object from the video frame may be implemented in a variety of ways. For example, the target object may be identified from the video frame by an Instance segmentation algorithm or a Semantic segmentation algorithm. In an actual application scenario, the target object may be identified by a neural network system such as Faster-rcnn, Mask-rcnn, etc. Specifically, the video frame may be input into a model of the above neural network system, and location information of the target object included in the video frame may be labeled in a result output by the model. The location information may be represented by coordinate values of pixels in the video frame that constitute the target object. Thus, a set of coordinate values of the pixels constituting the target object may indicate the region where the target object is located in the video frame.

At S3, selecting one or more geometric figures to fit the region where the target object is located, such that a combination of one or more geometric figures covers the region where the target object is located.

Figure 2:
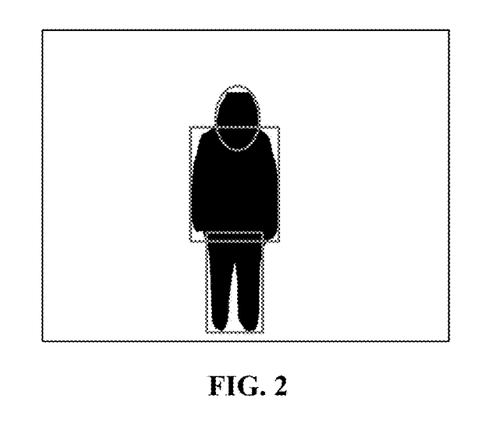
FIG. 2 is a schematic diagram illustrating fitting target object with geometric figures according to an embodiment of the present application.

In this embodiment, after determining the region where the target object is located in the video frame, one or more geometric figures may be selected to jointly fit the region where the target object is located, and the result of the fitting may indicate that the combination of the one or more geometric figures may just cover the region where the target object is located. For example, referring to FIG. 2, the target object to be identified in a current video frame is a human body, and after the human body as shown in FIG. 2 is identified from the current video frame, a region where the human body is located in the video frame may be fitted by an ellipse and a rectangle. Such as, the ellipse may be used to fit the head of the human body, and the rectangle may be used to fit an upper half and a lower half of the human body.

In this embodiment, when determining the above one or more geometric figures, the region where the target object is located may be divided into one or more sub-regions according to body features of the target object. Specifically, the body features may be flexibly set according to the type of the target object. For example, when the target object is a human body, the body features may be a head, a trunk, limbs, or the like. Of course, the number of sub-regions obtained by the division may also be different according to different fitting accuracy. For example, when the fitting accuracy is not necessary to be high, it is not necessary to divide the trunk and the limbs finely, and they may be simply divided into an upper half body and a lower half body. In practical applications, the region where the target object is located may be divided into one or more sub-regions by various gesture algorithms. For example, the gesture algorithms may include a DensePose algorithm, an OpenPose algorithm, a Realtime Multi-Person Estimation algorithm, an AlphaPose algorithm, a Human Body Pose Estimation algorithm, a DeepPose algorithm, etc.

In this embodiment, after respective sub-regions are obtained by division, a geometric figure may be selected to match with each of the sub-regions. For example, a circular or an ellipse may be selected for the head of the human body, and a rectangle may be selected for the trunk and limbs of the human body. In this way, the combination of the respective geometric figures corresponding to the sub-regions may cover the region where the target object is located.

At S5, generating a fitting parameter for each of the geometric figures according to a type of the geometric figure and a layout parameter of the geometric figure in the video frame, and taking a combination of the fitting parameters of each of the geometric figures as a fitting parameter of the video frame.

Figure 3:
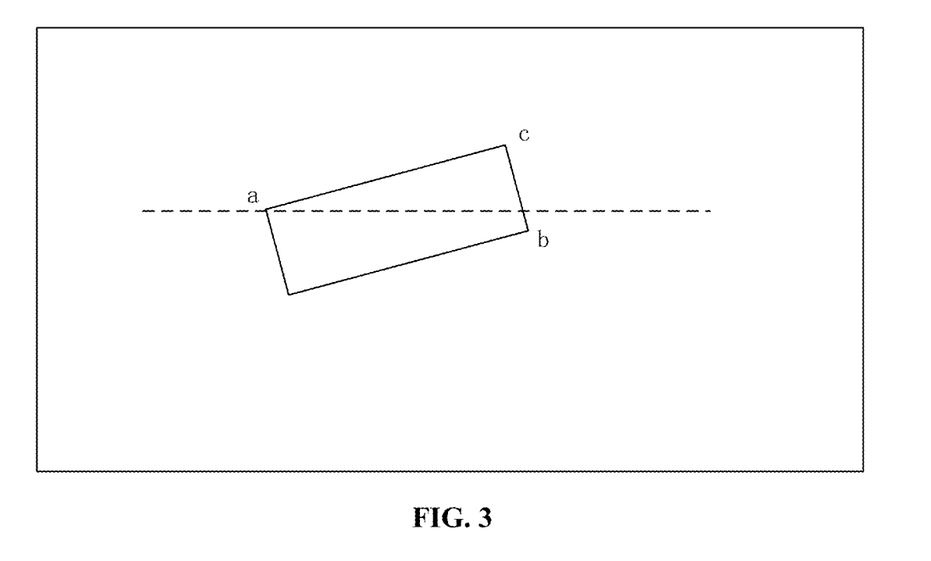
FIG. 3 is a schematic diagram illustrating a rectangular region according to an embodiment of the present application.
Figure 4:
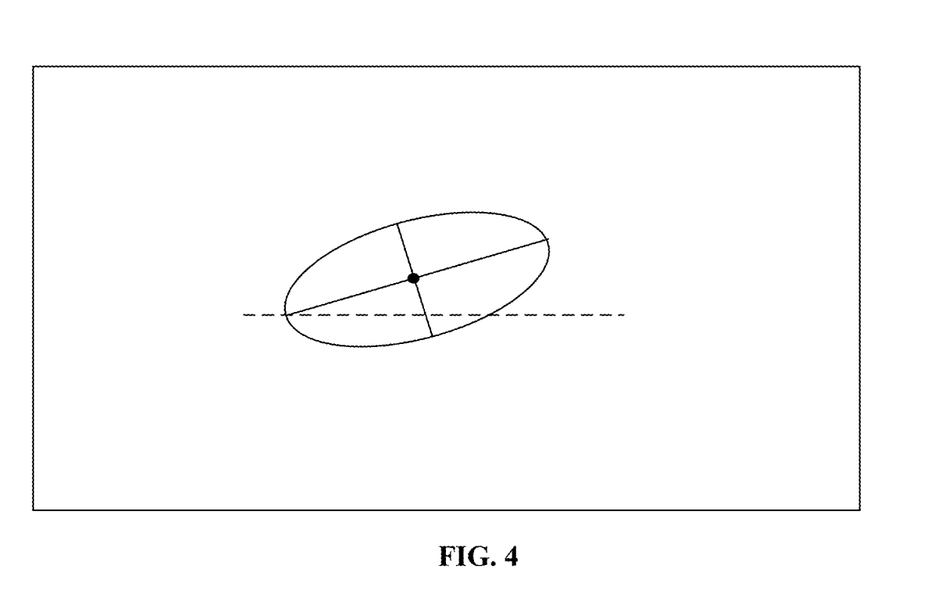
FIG. 4 is a schematic diagram illustrating an elliptical region according to an embodiment of the present application.

In this embodiment, after selecting one or more geometric figures capable of just covering the target object, a layout parameter may be subsequently determined for each of the geometric figures, so that the geometric figures drawn according to the layout parameters may cover sub-regions corresponding thereto. In practical applications, the determined layout parameter may be varied according to the various geometric figures. For example, the layout parameter for a rectangle may comprise coordinate values of two diagonal vertices of the rectangle in the video frame and an angle of a side of the rectangle to a horizontal line. As shown in FIG. 3, in order to determine the layout parameter of the rectangle in the video frame, the coordinate values of a vertex a and a vertex b and the angle between a side ac and a horizontal line (the dotted line in FIG. 3) may be determined. Thus, a region of the rectangular may be determined in the video frame according to these layout parameters. For example, in order to determine the region covered by the ellipse in FIG. 4, the determined layout parameters may include layout parameters such as coordinates of a center point of the ellipse, a major axis and a minor axis of the ellipse, and an angle of the major axis to the horizontal line (the dotted line in FIG. 4). As another example, in order to determine the region covered by a circle, the determined layout parameter may include a center and a radius of the circle.

In this embodiment, the fitting parameter of a selected geometric figure may be generated according to the type of the geometric figure and the layout parameter for the geometric figure. Specifically, the fitting parameter may be represented by an encoded value. Specifically, the type of a geometric figure may be represented by a preset graphic identifier. For example, the preset graphic identifier for a circle is 0, a preset graphic identifier for an ellipse is 1, a preset graphic identifier for an rectangular is 2, a preset graphic identifier for a triangular is 3, and the like. The layout parameter of a geometric figure may be represented by the coordinates of a pixel or the number of pixels covered by the geometric figure. For example, the center of a circle may be represented by coordinate values of the pixel at the center of the circle, and the radius thereof may be represented by the number of pixels covered by the radius. Both of the preset graphic identifiers and layout parameters as determined above may be represented in decimal, while they may generally be expressed in binary or hexadecimal in computer language. Therefore, after obtaining the preset graphic identifier and the layout parameter corresponding to a geometric figure, the preset graphic identifier and the layout parameter may be respectively encoded. For example, the preset graphic identifier and the layout parameter may be binary encoded. Assuming that in a decimal counting mode, the preset graphic identifier for the circular is 0, the coordinates of the center and the radius in the layout parameters are (16, 32) and 8 respectively; after being binary encoded, the preset graphic identifier may be 00, and the coordinates of the center of the circular may be represented as 010000 100000, the radius may be represented as 001000, and thus the combination thereof is 00 010000 100000 001000. Then, the encoded data may be finally taken as the fitting parameter for the geometric figure. The respective fitting parameter may be generated in the manner described above for each of the geometric figures included in the video frame. Finally, the combination of fitting parameters of respective geometric figures may be taken as a fitting parameter for the video frame.

Figure 5:
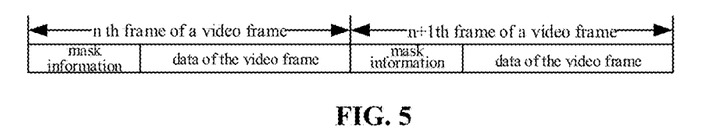
FIG. 5 is a structural diagram illustrating mask information and data of video frames according to an embodiment of the present application.

In one embodiment, after the fitting parameter of the video frame is generated, mask information of the video frame may also be generated according to the fitting parameters of the geometric figures. Specifically, in addition to the encoded fitting parameter, the mask information may also include an auxiliary identification bit added for the fitting parameter; and the auxiliary identifier bit is added for distinguishing the mask information of the video frame from real data of the video frame. Referring to FIG. 5, the processed video data may be divided according to each video frame, wherein, the mask information and the data of the video frame are connected end to end for one same video frame. If the auxiliary identifier bit is not added, other devices may not distinguish the mask information from the data of the video frame that needs to be rendered, when reading the video data. In view of this, an auxiliary identification bit may be added for the fitting parameter, and a combination of the auxiliary identification bit and the fitting parameter is taken as the mask information of the video frame. In this way, when reading video data, other devices may determine fields that indicate the mask information by identifying the auxiliary identification bit. In practical applications, the auxiliary identification bit may also be implemented in various ways. For example, the auxiliary identification bit may indicate the data size of the fitting parameter in binary, and the auxiliary identification bit may be a binary number at specified bits preceding to the fitting parameter. For example, the auxiliary identification bit may be a binary number of 6 bits. With respect to a fitting parameter 00 010000 100000 001000 of 20 bits, the auxiliary identification bit may be represented as 010100, and the mask information finally obtained may be 010100 00 010000 100000 001000. After reading a auxiliary identification bit of 6-bits, other devices may obtain that the data size of the fitting parameter is 20 bits, so that the 20-bit data may be read immediately and taken as a the contents of fitting parameter. Data after the 20-bit data may be taken as the data of the video frame to be rendered.

Figure 6:
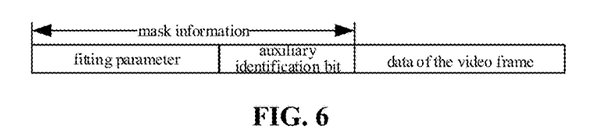
FIG. 6 is a schematic diagram illustrating an implementation of an auxiliary identification bit according to an embodiment of the present application.

In addition, in some other embodiments, the auxiliary identification bit may also indicate the number of geometric figures included in the fitting parameters, and when other devices read from the video data the fitting parameters of the geometric figures of a number in consistent with the number indicated by the auxiliary identification bit, the data that would be read subsequently is the data of the video frame to be rendered. Furthermore, the auxiliary identification bit may also indicate a data stop position of the fitting parameter. As shown in FIG. 6, the auxiliary identifier bit may be a string of preset fixed characters, and after reading the fixed characters, other devices may aware that the fitting parameter has already been read, and the data of the video frame to be rendered will be read subsequently.

In an embodiment, in order to more conveniently fit the region where the target object is located in the video frame, a binary mask image of the video frame may also be generated, after the region where the target object is located in the video frame is identified. Every pixel in the binary mask image may be provided with two different pixel values. The pixels constituting the region where the target object is located may have a first pixel value, and the other pixels may have a second pixel value. In practical applications, in order to match with the original video frame, the size of the generated binary mask image may be in consistent with that of the original video frame. Consistence in size may be presented as consistence in screen length and screen width as well as consistence in resolutions, so that the number of pixels included in the original video frame and that included in the generated binary mask image are in consistent. Of course, in order to reduce the data amount in the binary mask image, the generated binary mask image may only include the region corresponding to the target object, instead of including the entire region of the original video frame. Thus, the size of the generated binary mask image may be in consistent with that of a sub-region clipped from the original video frame, instead of being in consistent with the size of the original video frame. In this embodiment, after the binary mask image is generated, the region constituted by the pixels having the first pixel value may be directly fitted in the binary mask image by the plurality of geometric figures in the above manner, so as to obtain the fitting parameter for each of the geometric figures.

In one embodiment, the fitting parameters of the video frame may also be determined by machine learning. Specifically, an identification model may be trained for different target targets by using different sets of training samples. Firstly, a set of training samples may be obtained for the target object, and the set of training samples may include one or more image samples, and each of the image samples includes the target object. With respect to the training samples, geometric figures necessary for covering the target object may be manually labeled in each of the image samples. These labeled geometric figures may be represented by fitting parameters of the geometric figures, and the fitting parameter may include the type of geometric figure and the layout parameter of the geometric figure. That is to say, when the training samples are labeled, the fitting parameters corresponding to respective image samples may be generated, which may be taken as the labeled tags of the image samples.

Then, a preset identification model may be trained by manually labeled image samples. The identification model may include a deep neural network, and the neurons in the deep neural network may have initial weight values. After the input image samples is processed by the deep neural network carrying with the initial weight values, the prediction result corresponding to the input image samples may be obtained. The prediction result may indicate fitting parameters of the geometric figures necessary for covering the target object in the input image samples. Since the weight values carried by the identification model at an initial stage is not accurate enough, there will be a difference between the fitting parameters indicated by the prediction result and the manually labeled fitting parameters. Thus, after obtaining the prediction result, the difference values between the fitting parameters indicated by the prediction result and the manually labeled fitting parameters may be calculated, and then provided to the identification model as feedback data so as to alter the weight values of the neurons in the identification model. In this way, through repeatedly correcting the weight values, the prediction result output by the trained identification model would finally be in consistent with the fitting parameters indicated by the labeled tag of the input image sample after inputting any one of the image samples into the trained identification model. Thus, the training process may be completed.

Subsequently, when it is required to determine a fitting parameter of the video frame, the video frame may be input into the trained identification model, and the prediction result output by the trained identification model is taken as the fitting parameter of the video frame.

The present application further provides a system for fitting an object target in a video frame. The system comprises:

a region identifying unit configured for identifying a region where the target object is located in the video frame;

a geometric figure selecting unit configured for selecting one or more geometric figures to fit the region where the target object is located, such that a combination of the one or more geometric figures covers the region where the target object is located; and a fitting parameter generating unit configured for generating a fitting parameter for each of the geometric figures according to a type of the geometric figure and a layout parameter of the geometric figure in the video frame, and taking a combination of the fitting parameters of each of the geometric figures as a fitting parameter of the video frame.

In one embodiment, the geometric figure selecting unit comprises:

a sub-region dividing module configured for dividing the region where the target object is located into one or more sub-regions according to a body feature of the target object; and a layout parameter determining module configured for selecting, for any one of the sub-regions, a geometric figure matching with the sub-region, and determining a layout parameter of the geometric figure, so that the geometric figure drawn according to the layout parameter covers the sub-region.

In one embodiment, the fitting parameter generating unit comprises:

an encoding module configured for identifying a preset graphic identifier corresponding to the type of the geometric figure, encoding the preset graphic identifier and the layout parameter of the geometric figure respectively, and taking the encoded data as the fitting parameter of the geometric figure.

In one embodiment, the fitting parameter generating unit comprises:

a training sample set acquiring module configured for acquiring a set of training samples of the target object in advance, wherein, the set of training samples comprises one or more image samples, each of the image samples comprises the target object, and each of the image samples is provided with a labeled tag, wherein, the labeled tag is configured to indicate fitting parameters of geometric figures necessary for covering the target object in the image sample;

a training module configured for training an identification model using the image samples in the set of training samples, so that after any one of the image samples is input into the trained identification model, the prediction result output by the trained identification model is in consistent with the fitting parameters indicated by the labeled tag of input image sample; and a result predicting module configured for inputting the video frame into the trained identification model, and taking the prediction result output by the trained identification model as the fitting parameter of the video frame.

Figure 7:
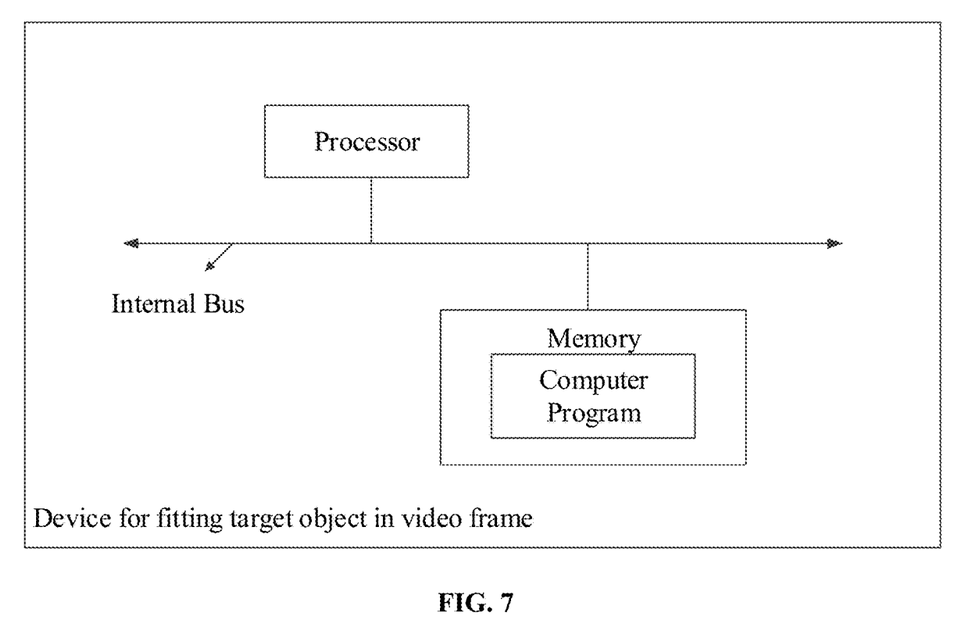
FIG. 7 is a structural diagram of a device for fitting a target object according to an embodiment of the present application.

Referring to FIG. 7, the present application further provides a device for fitting a target object in a video frame, the device comprises a processor and a memory, the memory is configured for storing a computer program, which when being processed by the processor, implements the above method for generating mask information. Specifically, as shown in FIG. 7, the device may include at the hardware level a processor, an internal bus, and a memory device. The memory device may include a memory as well as a non-volatile memory. The processor reads a corresponding computer program from the non-volatile memory into memory and then runs the computer program. It will be understood by those skilled in the art that the structure shown in FIG. 7 is merely illustrative, which does not limit the structure of the above device. For example, the device may include components more or less than those shown in FIG. 7, such as, the device may also include other processing hardware as a GPU (Graphics Processing Unit), or it may have a configuration different from that of FIG. 7. Of course, in addition to the software implementation, this application does not exclude other implementations, such as logic devices or a combination of software and hardware, etc.

In this embodiment, the processor may include a central processing unit (CPU) or a graphics processing unit (GPU), and the processor may also include other single-chip microcontroller, logic gate circuits, integrated circuits with logic processing capabilities, and the like, or a suitable combination thereof. The memory device described in this embodiment may be a storage device for storing information. In a digital system, a device capable of storing binary data may be the memory device; in an integrated circuit, a circuit having a storage function without a physical form may also be the memory device such as a RAM, a FIFO, etc.; in a system, a storage device in a physical form may also be be the memory device or the like. When implemented, the memory device may also be implemented by using a cloud memory, and the specific implementation is not limited in this specification.

It is noted that the specific implementation of the system and the device in this specification may be referred to the description of the above embodiments for the method, and details thereof are omitted herein.

It can be seen from the above that the technical solution provided by the present application may identify, with respect to the target object in the video frame, the region where the target object is located. The target object in the video frame may then be covered with a combination of one or more geometric figures by a geometric fitting. After determining the one or more geometric figures covering the target object, the fitting parameters of the geometric figures may be generated, the fitting parameters may indicate the type of each of the geometric figures and the layout of each of the geometric figures in the video frame. The fitting parameters of the geometric figures are not image data, thus, the data amount after fitting is reduced, thereby improving efficiency of subsequent processes.

Through the description of the above embodiments, the person skilled in the art would clearly understand that the respective embodiments may be implemented by means of software plus a necessary general hardware platform, and may also be implemented by hardware, of course. Based on such understanding, the essence or the parts that contribute to the existing technology of the above-described technical solutions may be embodied in the form of software product, the computer software product may be stored in a computer-readable storage medium such as ROM/RAM, magnetic discs, optical discs, etc., and may include instructions for causing a computer device (which may be a personal computer, a server, or a network device, etc.) to perform the methods described in various embodiments or portions of the embodiments.

The above-described are preferred embodiments of the present application only, which are not intended to limit the present application. Any modifications, equivalent substitutions, improvements, etc. made within the spirit and principles of the present application shall be considered as falling within the protection scope of the present disclosure.

What is claimed is:

1. A method for fitting a target object in a video frame, comprising:
   identifying a region where the target object is located in the video frame;
   selecting one or more geometric figures to fit the region where the target object is located, such that a combination of the one or more geometric figures covers the region where the target object is located; and
   generating a fitting parameter for each of the geometric figures according to a type of the geometric figure and a layout parameter indicating a layout of the geometric figure in the video frame, and taking a combination of the fitting parameters of each of the geometric figures as a fitting parameter of the video frame.

2. The method according to claim 1, further comprising: after identifying the region where the target object is located in the video frame, generating a binary mask image of the video frame, wherein, pixels constituting the region where the target object is located have a first pixel value in the binary mask image, and other pixels in the binary mask image have a second pixel value, wherein, the first pixel value is different from the second pixel value.

3. The method according to claim 2, wherein, selecting one or more geometric figures to fit the region where the target object is located comprises:
   fitting the region constituted of pixels having the first pixel value in the binary mask image by the one or more geometric figures.

4. The method according to claim 1, wherein, selecting one or more geometric figures to fit the region where the target object is located comprises:
   dividing the region where the target object is located into one or more sub-regions according to a body feature of the target object; and
   selecting, for any one of the sub-regions, a geometric figure matching with the sub-region, and determining a layout parameter of the geometric figure, so that the geometric figure drawn according to the layout parameter covers the sub-region.

5. The method according to claim 2, wherein, selecting one or more geometric figures to fit the region where the target object is located comprises:
   dividing the region where the target object is located into one or more sub-regions according to a body feature of the target object; and
   selecting, for any one of the sub-regions, a geometric figure matching with the sub-region, and determining a layout parameter of the geometric figure, so that the geometric figure drawn according to the layout parameter covers the sub-region.

6. The method according to claim 1, wherein, the layout parameter of the geometric figure in the video frame is represented by coordinate values of the pixels and/or a number of pixels.

7. The method according to claim 1, wherein, generating a fitting parameter for each of the geometric figures comprises:
   identifying a preset graphic identifier corresponding to the type of the geometric figure, encoding the preset graphic identifier and the layout parameter of the geometric figure respectively to result in encoded data, and taking the encoded data as the fitting parameter of the geometric figure.

8. The method according to claim 1, wherein, generating a fitting parameter for each of the geometric figures comprises:
   acquiring a set of training samples of the target object in advance, wherein, the set of training samples comprises one or more image samples, each of the image samples comprises the target object, and each image sample of the image samples is provided with a labeled tag, wherein, the labeled tag is configured to indicate fitting parameters of geometric figures necessary for covering the target object in the image sample;
   training an identification model using the image samples in the set of training samples, so that after any one of the image samples is input into the trained identification model, a prediction result output by the trained identification model is in consistent with the fitting parameters indicated by the labeled tag of the input image sample; and
   inputting the video frame into the trained identification model, and taking the prediction result output by the trained identification model as the fitting parameter of the video frame.

9. The method according to claim 1, further comprising:
   adding an auxiliary identification bit for the fitting parameter of the video frame, and generating mask information of the video frame based on a combination of the auxiliary identification bit and the fitting parameter of the video frame; wherein the auxiliary identification bit has at least one of the following functions:
   indicating a data size of the fit parameter of the video frame;
   indicating the number of the geometric figures included in the fitting parameter of the video frame; or
   indicating a data stop position of the fit parameter of the video frame.

10. A device for fitting a target object in a video frame, wherein, the device comprises a processor and a memory configured for storing a computer program, which when being processed by the processor, implements steps of:
    identifying a region where the target object is located in the video frame;
    selecting one or more geometric figures to fit the region where the target object is located, such that a combination of the one or more geometric figures covers the region where the target object is located; and generating a fitting parameter for each of the geometric figures according to a type of the geometric figure and a layout parameter indicating a layout of the geometric figure in the video frame, and taking a combination of the fitting parameters of each of the geometric figures as a fitting parameter of the video frame.

11. The device according to claim 10, wherein, the computer program, when being processed by the processor, further implements steps of:
generating a binary mask image of the video frame after identifying the region where the target object is located in the video frame,
wherein, pixels constituting the region where the target object is located have a first pixel value in the binary mask image, and other pixels in the binary mask image have a second pixel value, wherein, the first pixel value is different from the second pixel value.

12. The device according to claim 10, wherein, selecting one or more geometric figures to fit the region where the target object is located comprises:
dividing the region where the target object is located into one or more sub-regions according to a body feature of the target object; and
selecting, for any one of the sub-regions, a geometric figure matching with the sub-region, and determining a layout parameter of the geometric figure, so that the geometric figure drawn according to the layout parameter covers the sub-region.

13. The device according to claim 11, wherein, selecting one or more geometric figures to fit the region where the target object is located comprises:
dividing the region where the target object is located into one or more sub-regions according to a body feature of the target object; and
selecting, for any one of the sub-regions, a geometric figure matching with the sub-region, and determining a layout parameter of the geometric figure, so that the geometric figure drawn according to the layout parameter covers the sub-region.

14. The device according to claim 10, wherein, generating a fitting parameter for each of the geometric figures comprises:
identifying a preset graphic identifier corresponding to the type of the geometric figure, encoding the preset graphic identifier and the layout parameter of the geometric figure respectively to result in encoded data, and taking the encoded data as the fitting parameter of the geometric figure.

15. The device according to claim 10, wherein, generating a fitting parameter for each of the geometric figures comprises:
acquiring a set of training samples of the target object in advance, wherein, the set of training samples comprises one or more image samples, each of the image samples comprises the target object, and each of the image samples is provided with a labeled tag, wherein, the labeled tag is configured to indicate fitting parameters of geometric figures necessary for covering the target object in the image sample;
training an identification model using the image samples in the set of training samples, so that after any one of the image samples is input into the trained identification model, a prediction result output by the trained identification model is in consistent with the fitting parameters indicated by the labeled tag of input image sample; and
inputting the video frame into the trained identification model, and taking the prediction result output by the trained identification model as the fitting parameter of the video frame.

16. The device according to claim 10, wherein, the computer program, when being processed by the processor, further implements steps of:
adding an auxiliary identification bit for the fitting parameter of the video frame, and generating mask information of the video frame based on a combination of the auxiliary identification bit and the fitting parameter of the video frame; wherein the auxiliary identification bit has at least one of the following functions:
indicating a data size of the fit parameter of the video frame;
indicating the number of the geometric figures included in the fitting parameter of the video frame; or
indicating a data stop position of the fit parameter of the video frame.

17. A non-transitory computer readable storage medium having stored thereon a computer program, when being executed by a processor, the computer program implements steps of:
identifying a region where the target object is located in the video frame; selecting one or more geometric figures to fit the region where the target object is located, such that a combination of the one or more geometric figures covers the region where the target object is located; and
generating a fitting parameter for each of the geometric figures according to a type of the geometric figure and a layout parameter indicating a layout of the geometric figure in the video frame, and taking a combination of the fitting parameters of each of the geometric figures as a fitting parameter of the video frame.

18. The non-transitory computer readable storage medium according to claim 17, wherein, the computer program, when being processed by the processor, further implements steps of:
generating a binary mask image of the video frame after identifying the region where the target object is located in the video frame,
wherein, pixels constituting the region where the target object is boated have a first pixel value in the binary mask image, and other pixels in the binary mask image have a second pixel value, wherein, the first pixel value is different from the second pixel value.

19. The non-transitory computer readable storage medium according to claim 17, wherein, selecting one or more geometric figures to fit the region where the target object is located comprises:
dividing the region where the target object is located into one or more sub-regions according to a body feature of the target object; and
selecting, for any one of the sub-regions, a geometric figure matching with the sub-region, and determining a layout parameter of the geometric figure, so that the geometric figure drawn according to the layout parameter covers the sub-region.

20. The non-transitory computer readable storage medium according to claim 17, wherein, generating a fitting parameter for each of the geometric figures comprises:
identifying a preset graphic identifier corresponding to the type of the geometric figure, encoding the preset graphic identifier and the layout parameter of the geometric figure respectively to result in encoded data, and taking the encoded data as the fitting parameter of the geometric figure.

* * * * *

UNITED STATES PATENT AND TRADEMARK OFFICE
CERTIFICATE OF CORRECTION

PATENT NO. : 10,699,751 B1  
APPLICATION NO. : 16/442081  
DATED : June 30, 2020  
INVENTOR(S) : Lei Sun et al.

Page 1 of 1

It is certified that error appears in the above-identified patent and that said Letters Patent is hereby corrected as shown below:

On the Title Page

Item (30), should be added to include the following Foreign Application Priority Data:  
Feb. 01, 2019 (CN) ................................... 201910105682.5

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*